US006510277B1

(12) United States Patent
Dongo

(10) Patent No.: US 6,510,277 B1
(45) Date of Patent: Jan. 21, 2003

(54) POOL AND SPA COMPONENTS WITH FIBER OPTIC ILLUMINATION

(75) Inventor: Paul A. Dongo, Camarillo, CA (US)

(73) Assignee: Waterway, Inc., Oxnard, CA (US)

( * ) Notice: Subject to any disclaimer, the term of this patent is extended or adjusted under 35 U.S.C. 154(b) by 55 days.

(21) Appl. No.: 09/678,895

(22) Filed: Oct. 4, 2000

(51) Int. Cl.[7] .......................... G02B 6/00; A61H 33/02
(52) U.S. Cl. .......................................... 385/147; 4/546
(58) Field of Search ........................... 385/147, 60, 67, 385/84, 93, 94; 4/541.1, 546

(56) References Cited

U.S. PATENT DOCUMENTS

| | | | | |
|---|---|---|---|---|
| 4,617,615 A | | 10/1986 | Eychaner | 362/216 |
| 5,051,875 A | | 9/1991 | Johnson | 362/101 |
| 5,122,936 A | | 6/1992 | Guthrie | 362/101 |
| 5,172,508 A | * | 12/1992 | Schmidt et al. | 43/17.5 |
| 5,604,940 A | * | 2/1997 | Shimizu | 4/541.1 |

OTHER PUBLICATIONS

Waterway Plastics Inc., "1999 Product Catalog", SPA Products, p. 31.

* cited by examiner

*Primary Examiner*—Brian Sircus
*Assistant Examiner*—Chandrika Prasad
(74) *Attorney, Agent, or Firm*—Koppel, Jacobs, Patrick & Heybl

(57) ABSTRACT

A reservoir component is disclosed that provides fiber optic illumination to the water within the reservoir. The reservoirs of water include pools, spas, tubs and the like, and their components include jets, returns, drains and skimmers. An elongated and transparent probe is mounted within the component and extends from the rear of the component toward the front. The probe is open at the rear of the jet and is hollow through most of its length to receive and house an optical fiber. The light emitting from the end of the fiber passes through the end of the probe and out of the component. The probe can protrude from the front of the component and transmit the light directly into the water. Alternatively the probe can transmit short the components front end which is constructed of transparent material to transmit the light from the probe into the water.

23 Claims, 8 Drawing Sheets

POOL AND SPA COMPONENTS WITH FIBER OPTIC ILLUMINATION

BACKGROUND OF THE INVENTION

1. Field of the Invention

This invention relates to fiber optic illumination of pools, spas, and the like.

2. Description of the Related Art

Reservoirs of water such as pools and spas are commonly constructed with one or more underwater light sources for illuminating the water within the reservoir. The light sources are visually appealing and the illumination of the water allows for safe use of the pool or spa at night. Conventional lighting units are commonly mounted on the wall of the pool or spa, and comprise a watertight housing that contains an incandescent light source. On one side of the housing is an aperture for the power connection to the light source, and on the other side is a lens to scatter, direct or focus the light from the light source. Each lighting unit requires its own mounting hole in the wall of pool or spa and its own power connection. [See Waterway Plastics Inc., "1999 Product Catalog," Spa Products, Page 31].

A number of variations to the conventional pool or spa light have been developed. U.S. Pat. No. 4,617,615 to Eychaner, discloses a pool light that uses a circular fluorescent light bulb instead of an incandescent light source. The bulb is mounted in a fixture that can be retrofitted into or be used as an alternative to existing incandescent pool lights. Its primary advantage is that it is relatively low cost and allows for the replacement of high wattage incandescent bulbs with low wattage fluorescent bulbs.

U.S. Pat. No. 5,122,936 to Guthrie, discloses a pool light that can be mounted over a pool's water extraction conduit. The light includes a watertight chamber that houses a electric light source, the chamber being held away from the pool's wall by an annular housing member that has several holes. Water passes through the annular housing holes, behind the chamber, and to the extraction conduit. The advantage of this light is that it can illuminate the pool while providing a protective cover over the extraction conduit.

U.S. Pat. No. 5,051,875 to Johnson also discloses a pool light mounted on a gunite pool wall or a vinyl liner pool wall. A double quartz halogen lamp is mounted in a sealed light source cavity with the lamp in a plane parallel to the plane of the pool wall on which the light is mounted. The pool light also includes openings that allow the liquid of the pool to circulate behind the light housing to cool the light.

One of the disadvantages of the above lights is that a separate hole must be created in the wall of the pool or spa for either mounting the light or allowing the light's power connection to pass through the wall. The greater the number of holes in a pool or spa wall, the greater the danger of water leaking through a hole. Another disadvantage of the above lights is that when an individual light fails, it can be difficult to repair. The process can require lowering the water level to repair the light from the water side of the pool or spa. Alternatively, the light can be accessed from the exterior side of the pool or spa, which can require removing decking, excavating soils and/or cutting through insulation. Also, to change the color of the light the bulb or lens must be changed. For the same reasons, this can be a difficult process.

Another disadvantage is that by having the incandescent, fluorescent or quartz light source close to the water, a short circuit can occur between the light source and the water. This is particularly a problem if there is a crack in the light's housing. As the number of lights is increased, the total potential current leakage from all the lights increases.

Fiber optic lighting systems have been developed for spas by, among others, Coast Spas located in British Columbia, Canada. The system includes a remote light source and numerous optical fibers directed toward a number of holes in the spa wall. Each hole has a cap to hold one of the optical fibers so that the light emitting from the end of the fiber is directed through the cap and into the water within the spa. Each cap has a transparent lens that disperses or focuses the light from the fiber. A typical spa can have dozens of holes for optical fibers that increase the spals complexity and the chances that the spa will leak.

SUMMARY OF THE INVENTION

The present invention provides an improved light for illuminating the water within a pool, spa or other water reservoir, all of which will be referred to collectively as a "spa". The new light combines fiber optic lighting with the spa components. These components include, but are not limited to, jets, returns, drains, and skimmers.

The new light includes a remote light source and guides that carry light from the remote light source to the spa component. One or more probes are mounted within each component with each probe receiving light from a respective guide, the light from the guide passing through the probe and emitting from the front of the respective component.

In one embodiment, the remote light source transmits the light to each probe by a optical fiber with light emitting primarily from the end of each fiber. The probe is elongated and transparent and is inserted and mounted in a hole in the rear of its component. The probe is hollow, open on its back end and closed at its front end. The optical fiber is inserted into the probe through its open end and is housed within the probe terminating at the probe's closed end. The light from the fiber passes through the end of the probe and emits from the component.

In one spa jet embodiment, the probe is mounted within a hole in the rear of a spa jet, projecting toward the front of the jet along the jet's longitudinal axis. Near its open end, the probe has axial threads on its outer surface that mate with threads on the hole at the rear of the jet to provide a watertight seal between the two. The probe's open end opens to the rear of the jet and is accessible when the probe is installed. The optical fiber is inserted into the probe through its open end and held by a metal crimp. The new light has many advantages, one of which is its ability to illuminate the spa without creating additional holes in the spa's wall. The illumination is provided through the same holes created for the other spa components, i.e. jets, drain, returns, etc. Also, a remote light source is used to provide the light carried by the optical fibers to the spa. There are no light sources near the spa's water that could short circuit to the spa. Furthermore, if the light source fails, it is easily repaired at its remote location. There is no need to lower the spa's water level, remove decking, excavate soil, or cut through insulation. Also, it is conventional for fiber optic light sources to contain color wheels that automatically rotate to change the color of light emitted by the optical fibers. The lenses or light sources do not need to be changed to change the color of light emitted from the spa component.

These and further features and advantages of the invention will be apparent to those skilled in the art from the following detailed description, taken together with the accompanying drawings, in which:

DETAILED DESCRIPTION OF THE INVENTION

Figure 1:
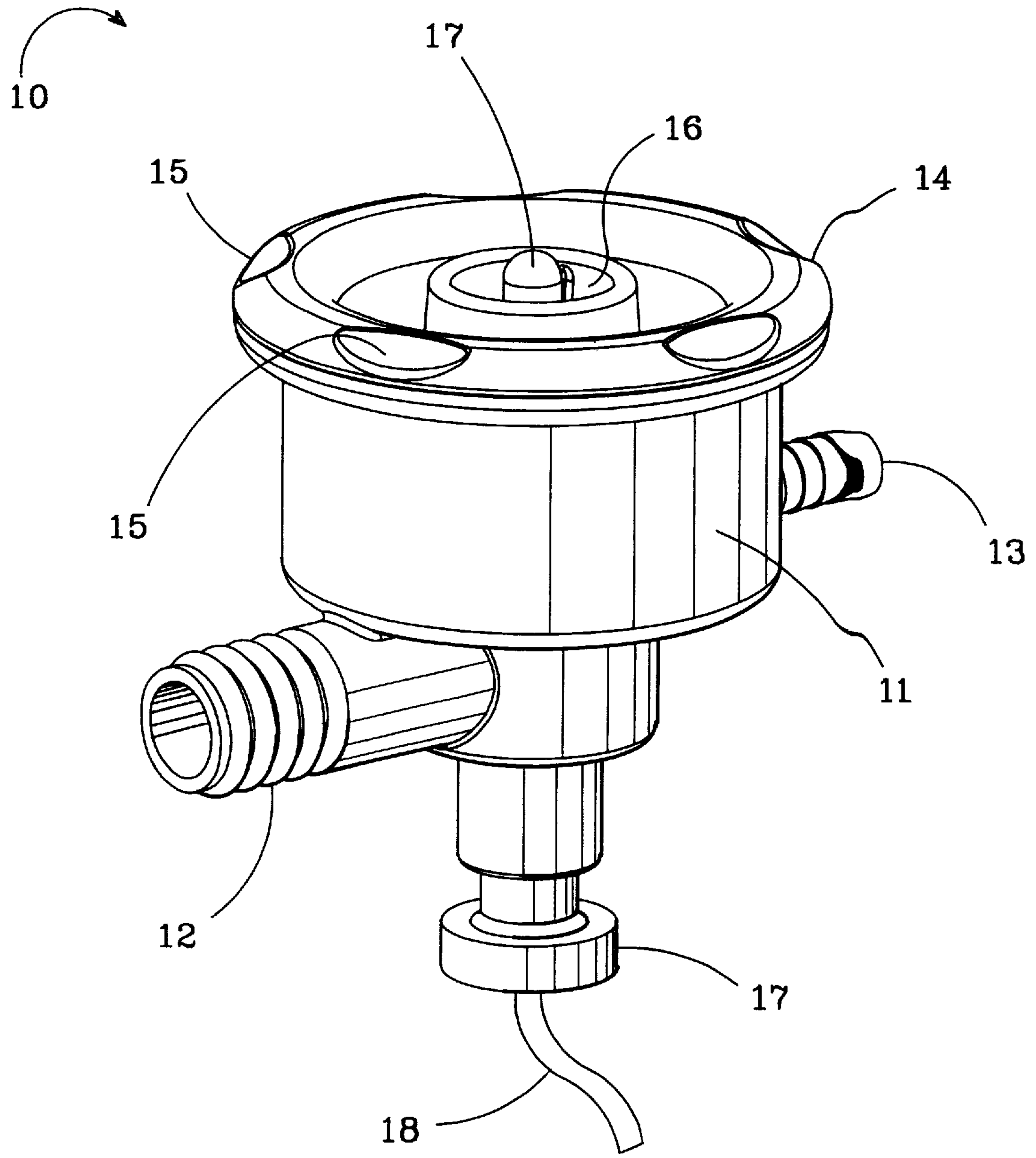
FIG. 1 is a perspective view of one embodiment of a new spa jet with fiber optic illumination.

A new spa jet 10 with optical fiber illumination constructed in accordance with the invention is shown in FIG. 1. Most of the jet's components are formed from a water impervious plastic such as ABS. The jet is particularly adapted to be positioned below the water line of a spa with the majority of the jet positioned behind the spa's water contacting wall. The jet is connected to the spa's plumbing water supply, and the jet of air and water which emits is directed toward the water within the spa.

As shown in FIG. 1, the new jet 10 includes a jet body 11 having a water inlet pipe 12 that receives a standard water supply tube. The body can also have an air inlet tube 13 to allow air into the jet body when aerated water is desired. Water (or aerated water) exits the jet body through outlet 16. The jet body 11 has an external flange 14 that is positioned on the spa's water contacting wall. The flange 14 has a series of depressions 15 around its perimeter for gripping to rotate the flange and tighten the jet on the spa wall as more fully described below.

The new jet 10 also has an elongated transparent probe 17 the runs the length of the jet along the jet's longitudinal axis. The preferred probe 17 is inserted into the jet 10 through a hole in the rear of the jet body 11 and threaded into the jet body 11 to provide a watertight seal. The end of the probe 17 at the rear of the jet body 11 has an opening for a optical fiber 18. The end of the optical fiber 18 is housed within the probe, with the fiber's emission directed toward the probe's closed end. The probe runs through the jet outlet 16 and out the front of the jet 10. Light from the optical fiber passes through the end of the probe 17 to illuminate the water within the spa.

Figure 2:
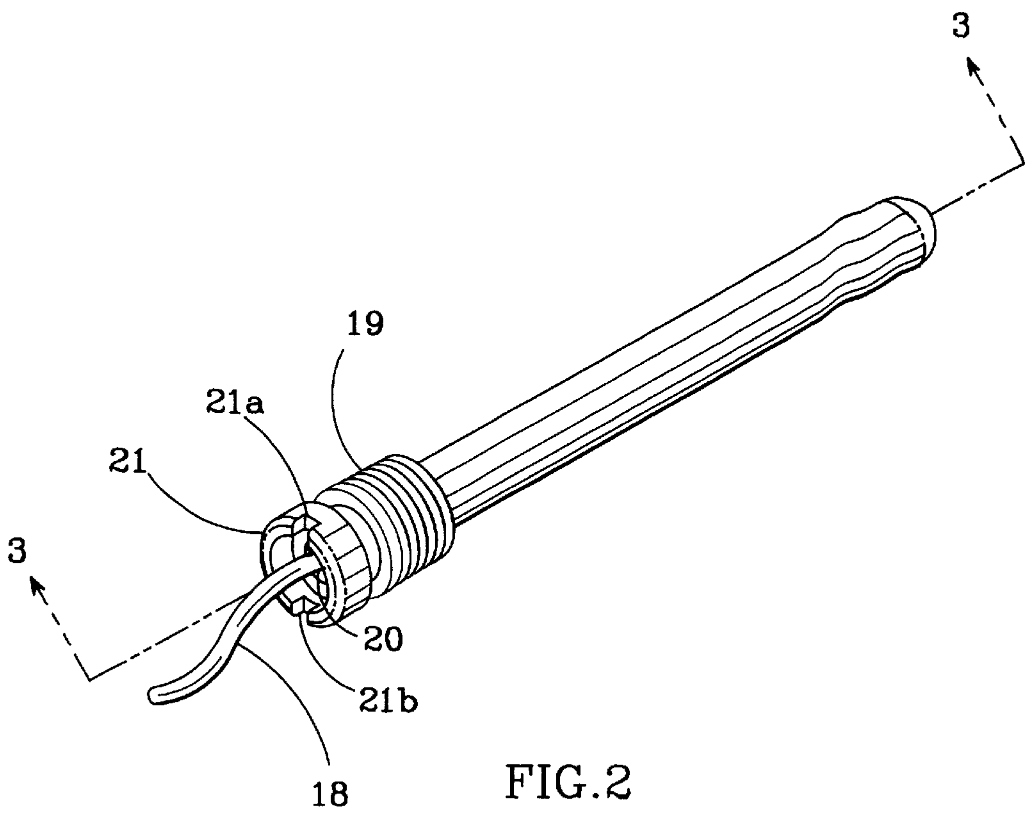
FIG. 2 is a perspective view of the elongated transparent probe with an optical fiber.
Figure 3:
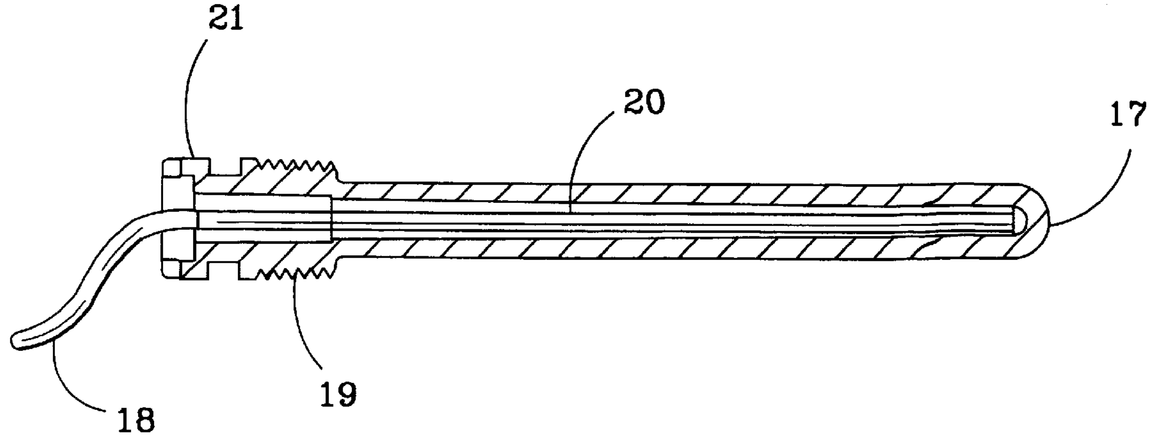
FIG. 3 is a sectional view of the probe shown in FIG. 1, taken along section lines 3—3.

FIGS. 2 and 3 show the elongated probe 17 with the optical fiber 18 housed within it. The probe 17 has a hollow section 20 along its longitudinal axis, that runs substantially the entire length of the probe. The hollow section is closed at one end and open at its other end. The optical fiber 18 is inserted into the probe 17 through its open end and held in place by a commercially available press fit metal crimp (not shown).

Near the probe's open end threads 19 are provided on the exterior surface that mate with threads in the rear hole of the particular spa component to mount the probe within the component. A screwdriver receiver 21 having a larger diameter is provided at the base of the probe adjacent to it's open end. The receiver section 21 has slots 21*a* and 21*b* for a standard screwdriver to turn the probe 17 into the component.

The size of the probe 17 can be selected to match the spa component into which it fits; its dimensions are not critical to the invention. The preferred length of the probe is in the range of 7 to 13 cm, and the preferred outer diameter (for a round probe) is in the range of 0.5 to 2 cm. The diameter of the hollow portion is preferably about half the probels outer diameter. The probe 17 can be made of many different materials that transmit, disperse or focus light, preferably transparent or semi-transparent polycarbonate. Alternatively, the probe can be opaque along its length and transparent only at its front end, although it is preferably homogeneous throughout its length.

The probe can have many different shapes and dimensions, and can be arranged within the jet 10, or other spa components, in different ways. A probe according to the present invention receives light from a remote light source, through an optical fiber, and passes the light through the spa component into the spa.

Figure 4:
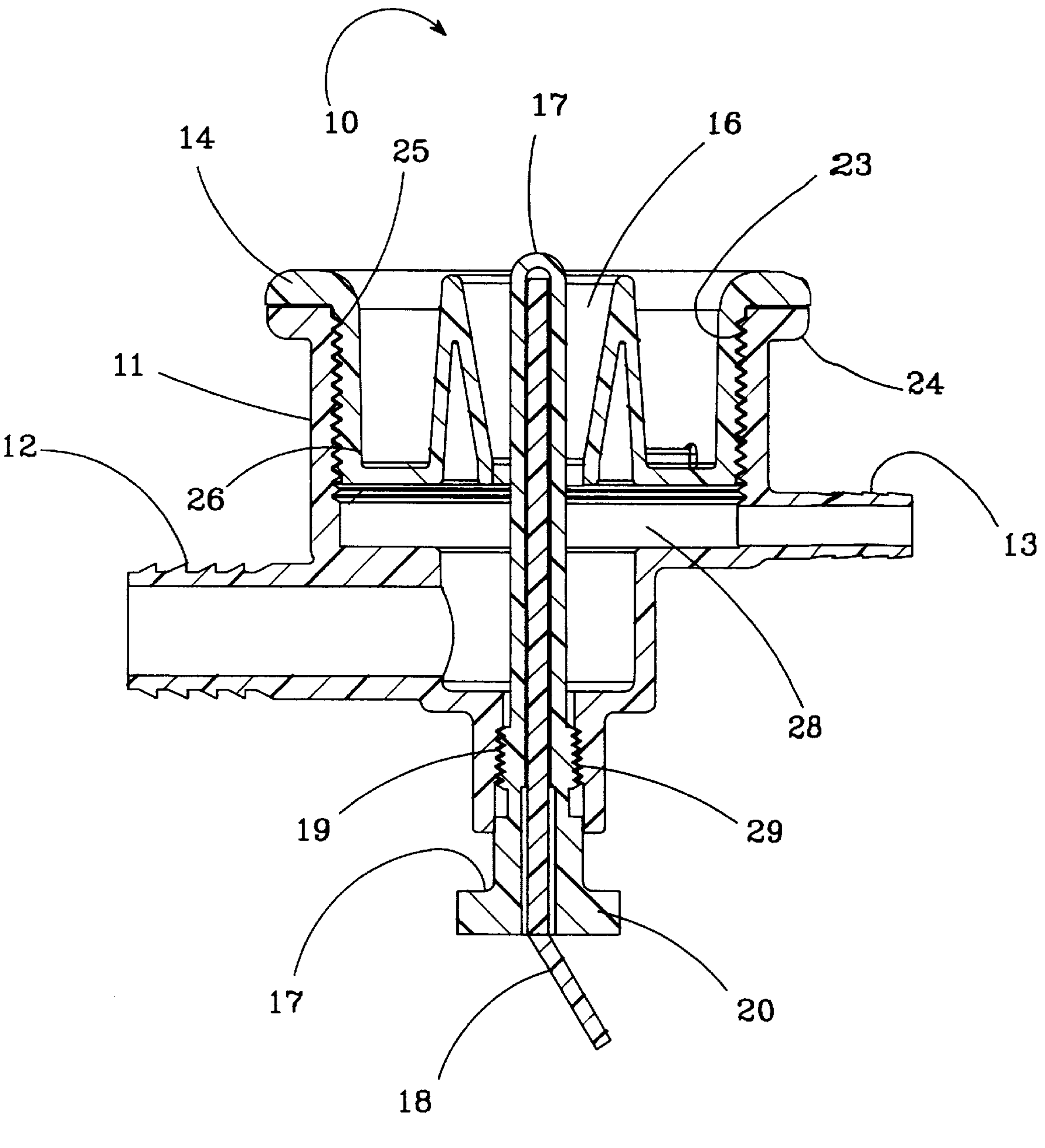
FIG. 4 is a sectional view of the spa jet shown in FIG. 3, taken along section lines 4—4.
Figure 5:
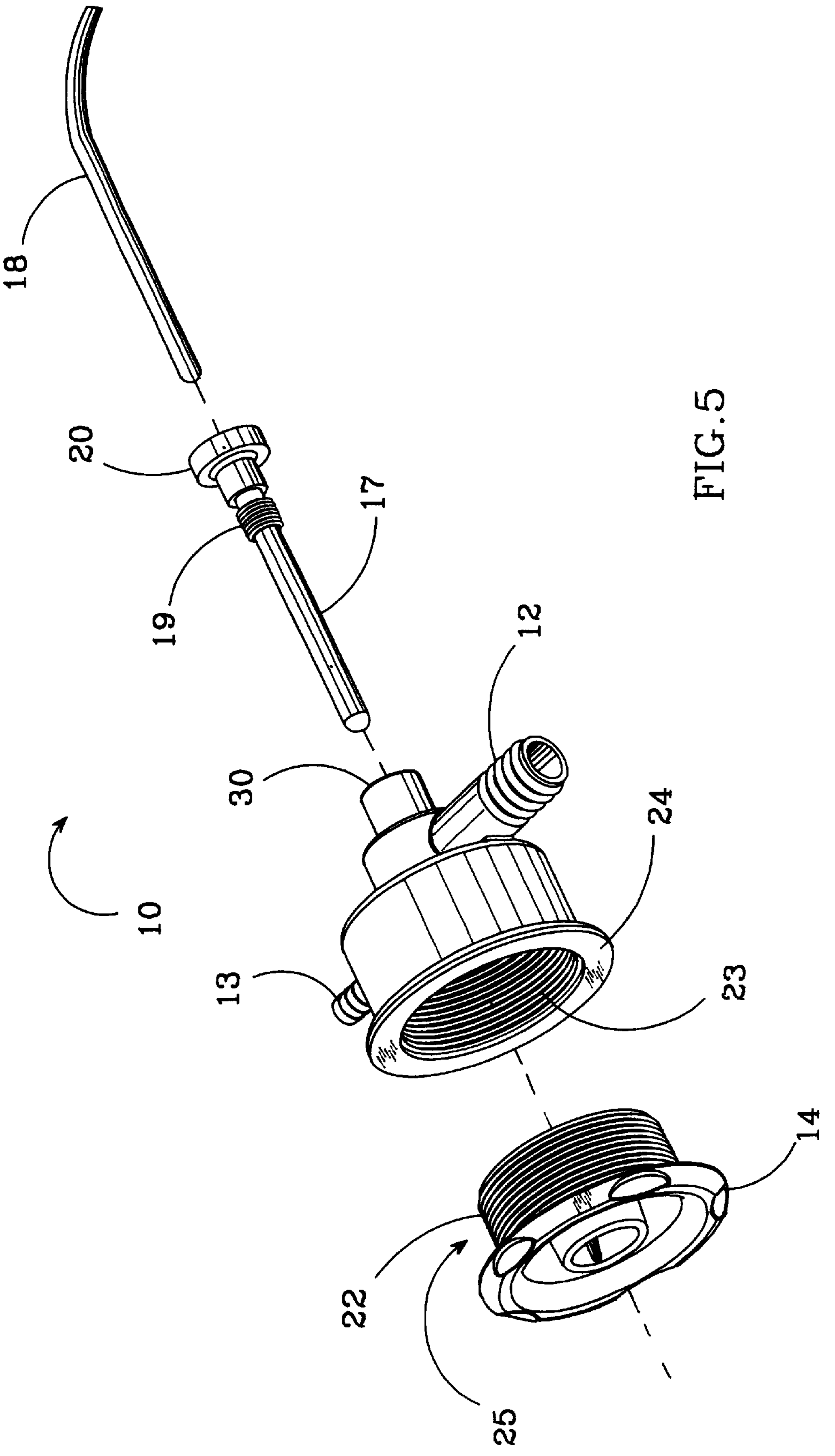
FIG. 5 is an exploded view of the spa jet shown in FIGS. 3 and 4.

FIG. 4 is a sectional view and FIG. 5 is an exploded view of the jet 10 shown in FIG. 1. The jet body 11 has an interior threaded cavity 23 that opens toward the interior of the spa, with a flange 24 at the forward end of the cavity 23. A wall fitting 25 includes a threaded tube 26 that is inserted from the interior of the spa through an opening in the spa wall, and threads into the cavity 23. The wall fitting 25 is screwed into the housing cavity until a flange 14 on the wall fitting 25 tightens against the spa wall. A circular gasket can be included on the wall fitting 25 to provide a seal between the flange 27 and the spa wall. The jet 10 is held securely in place, with the spa wall sandwiched between the cavity flange 24 and wall mounting flange 27.

Water enters the jet 10 through water inlet pipe 12 and exits through the jet outlet 16. If a mixture of air and water is desired, air enters the jet 10 through the air inlet tube 13 and the water and air mix within the cavity 28 in the jet housing 11 before exiting through the jet outlet 16.

The probe 17 is inserted into the jet from the rear, with the probe threads 19 screwed into the jet body threads 29 in the jet body's rear opening 30. The mated threads form a watertight seal that prevents water passing through the jet 10 from leaking through the threads or into the probe's hollow section. The optical fiber 18 is housed within the probe 17 with light emitting primarily from its end. The light passes through the hemispherically curved front end of the probe and is refracted into a generally hemispheric pattern. The air and water emitted from the jet outlet 16 help to further refract the light.

When the jet 10 does not have a probe 17, a threaded plug (not shown) is included to mate with the rear opening 30 and provide a watertight seal that prevents water leakage. This allows the jet 10 to function without the probe 17 and without light emitting from the jet.

Figure 6:
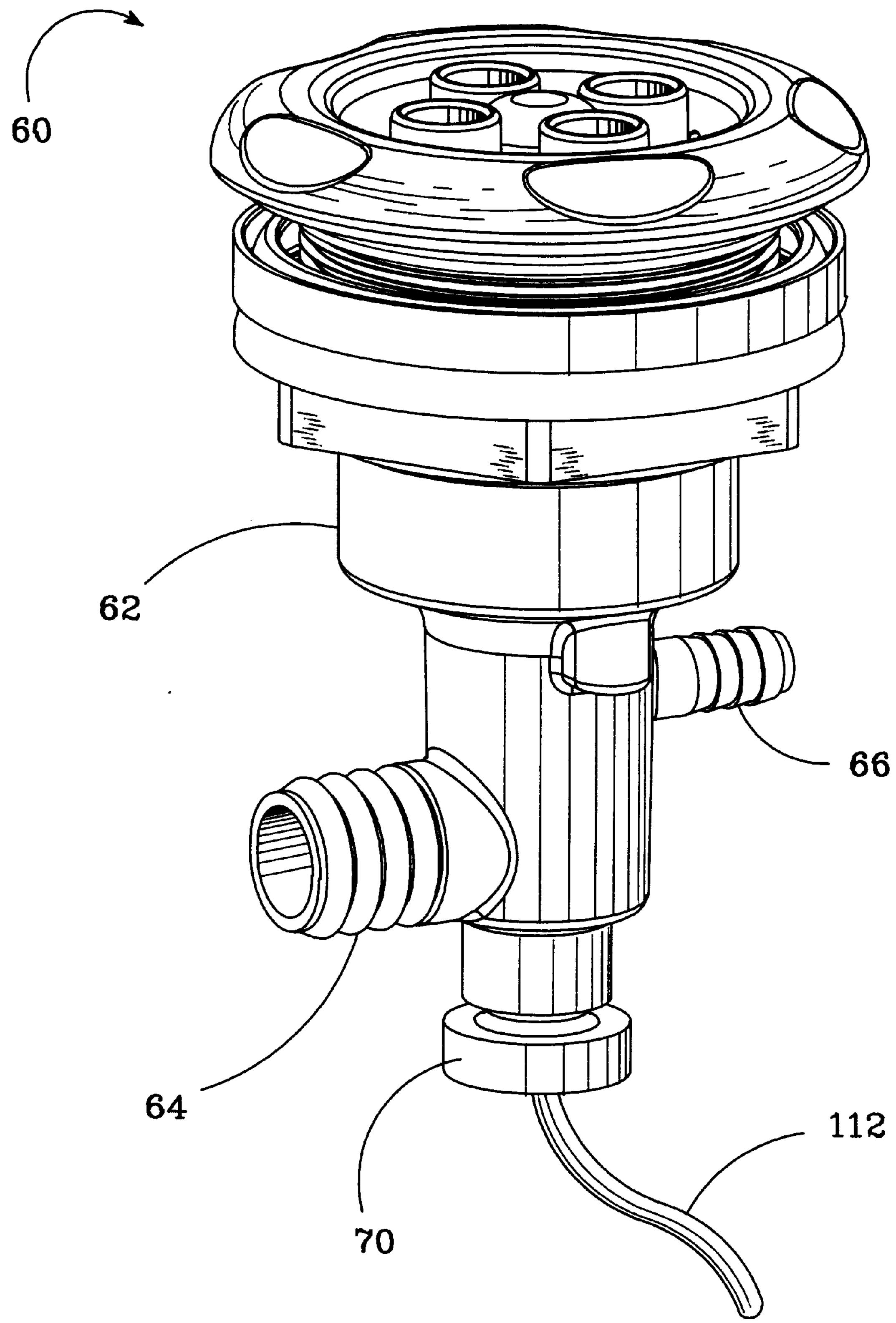
FIG. 6 is a perspective view of a second embodiment of a new spa jet with fiber optic illumination.
Figure 7:
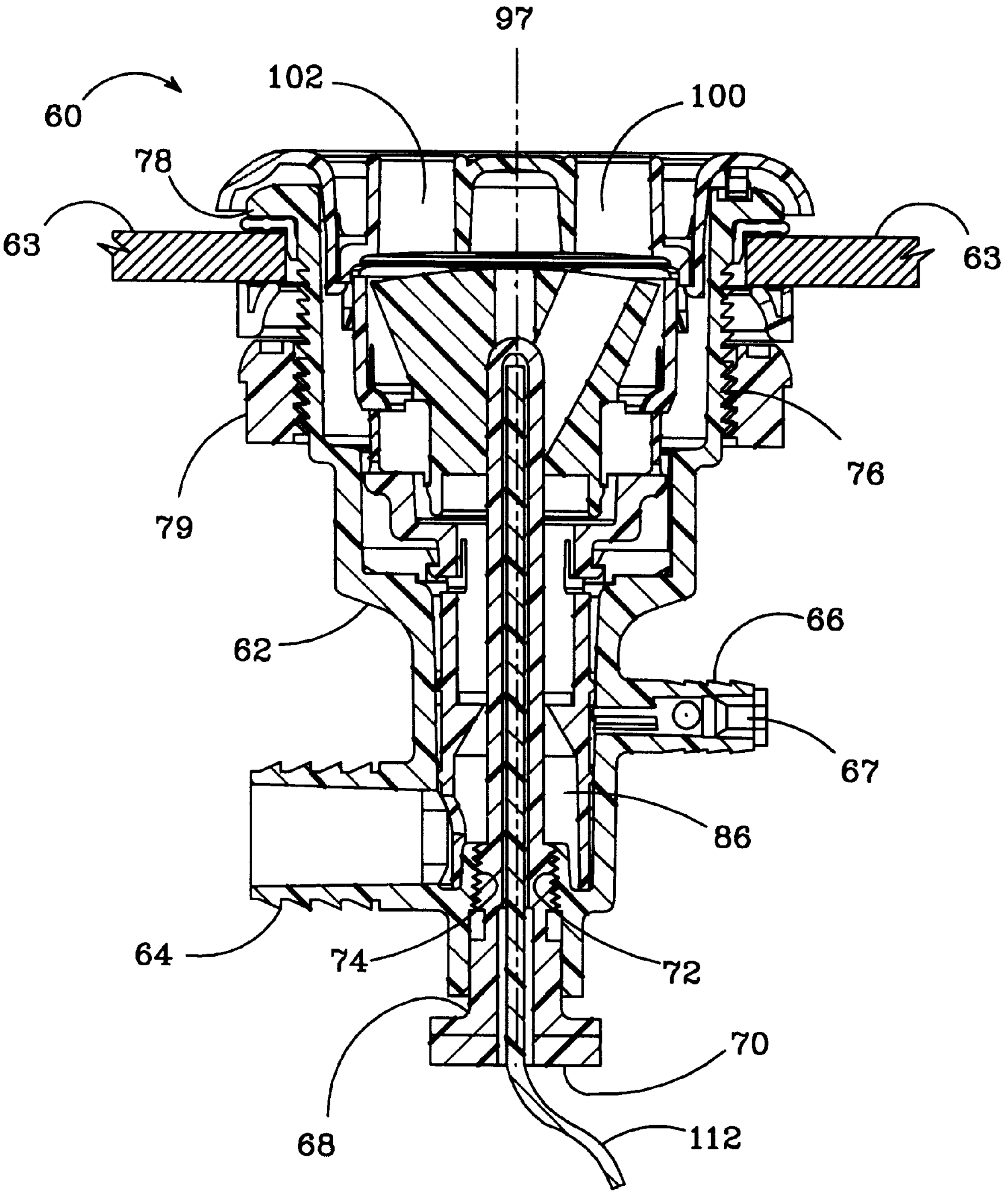
FIG. 7 is a sectional view of the spa jet shown in FIG. 6, taken along section lines 7—7.
Figure 8:
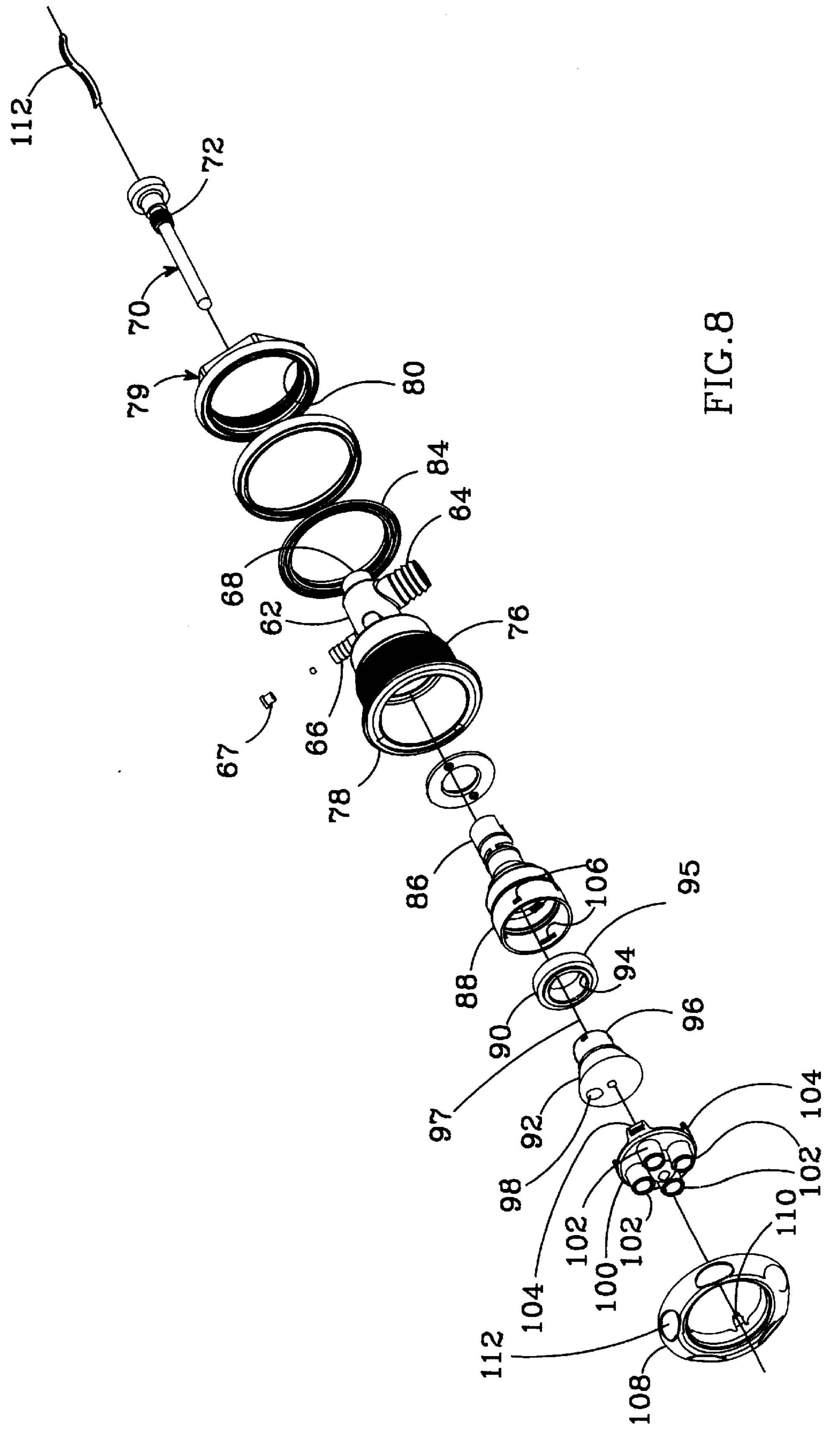
FIG. 8 is an exploded view of the spa jet shown in FIGS. 6 and 7.

FIGS. 6–8 show a second embodiment of a spa jet 60 with fiber optic illumination, in which the probe and its optical fiber are foreshortened to allow for a rotating jet outlet. The jet includes a jet body 62 with a water inlet 64 to connect to the spa's plumbing, and an air inlet 66 to aerate the water. The air inlet 66 includes a check valve 67 that prevents water from back flowing into the air supply system. Like the stationary embodiment above, the jet body 62 has a threaded rear opening 68. A probe 70 is inserted into the jet body 62 through the rear hole and the probe's threads 72 mate with the rear hole's threads 74 to form a watertight seal. The probe 70 is aligned with the jet's longitudinal axis but, unlike the stationary embodiment, it does not extend through the entire length of the jet body 62.

The jet body 62 has exterior threading 76 and a front flange 78 that rests against the spa's interior wall when the jet is installed. A wall fitting 79 on the spa's exterior wall opposite the front flange 78 has interior threads 80 that mate with the jet body's exterior threads 76. The wall fitting 79 is screwed into the jet body's exterior threads 76 until the flange 78 tightens against the interior spa wall. A circular gasket 84 can be included on the jet body 62 to provide a seal between the flange 78 and the spa wall. The jet 62 is held securely in place with the spa wall sandwiched between the flange 78 and wall fitting 79.

Water enters the jet 60 through the water inlet 64 and flows through the jet nozzle 86. The probe 70 passes through the nozzle 86 along the jet's longitudinal axis, reducing the volume of water that can pass through the nozzle. As a result, the nozzle should have a larger volume than would be necessary for a conventional spa jet. This allows a sufficient volume of water to pass through the jet to maintain it's water pressure. The interior surface of the nozzle 86 tapers slightly to accelerate the water flowing through the nozzle, creating a venturi effect. A passageway allows air to flow from the air inlet 66 to the forward end of the nozzle 86. At that location, the air is entrained into the water jet due to the venturi action, causing a desirable water/air mixture to be emitted from the jet. The probe 70 passes through the nozzle's venturi section and like other nozzle sections, the venturi section should have a larger volume to maintain water pressure.

Attached at the downstream end of the nozzle 86 is an eyeball carrier 88 having a rotation bearing 90 mounted within it. A rotatable eyeball 92 is mounted within the carrier 88 at the downstream end of the nozzle 68 so that the water stream enters the eyeball and causes it to rotate. Eyeball 90 is seated within the bearing 90, with the bearing's inner race 94 against an eyeball sleeve 96. The outer race 95 of bearing 90 is against the inside wall of the carrier 88.

Eyeball 92 has a rotation axis 97 that is coincident with the jet's longitudinal axis. The eyeball 92 also has at least one linear water conduit 98 passing through it, with the conduits having a longitudinal axis that is offset from the eyeball's rotation axis 97 such that water can enter the conduit 98 around the probe 70 and causes the eyeball to rotate. The jet flow exiting eyeball 92 traces a continuous circular pattern. The eyeball can have more than one conduit, but probe 70 consumes space and reduces the volume of water passing through the jet. Dividing the water flow between more than one conduit reduces the pressure of water exiting each conduit.

Located downstream of the eyeball 92 is a diverter cap 100 which diverts the water flowing from the eyeball 92 to produce a series of pulsating jets. The cap includes a plurality of conical bores 102 disposed in a ring around the eyeball's rotation axis 97. The bores 102 are aligned with the circular pattern of the jet flow exiting conduit 98 and emit a jet pulse each time the conduit jet passes by them. The result is a circular pattern of jet pulses that is pleasing to the user.

The diverter cap 100 attaches to the eyeball carrier 88 by a series of tabs 104 that are equally spaced around the perimeter of the diverter cap and mate with four axial grooves 106 in the carrier 88. The eyeball 92 is held on the bearing 90 and within the carrier 88 by the diverter cap 100. An escutcheon 108 is also attached to the eyeball 92 by a series of 110 that mate with the recesses in the carrier. A series of depressions 112 are included around the escutcheon's perimeter for gripping. Rotation of escutcheon 108 results in rotation of the carrier 88 and nozzle 86. This in turn regulates the flow of water into the nozzle 86 from the water conduit 64.

Like the stationary embodiment, an optical fiber 112 is held within the probe 70, such as by a press fit metal crimp (not shown), and light from the optic fiber exits through the end of the probe 70. The probe does not pass through the entire jet, but extends only partially into the eyeball 92. The eyeball 92 and diverter cap 100 are made of a transparent or semitransparent material that allows light from the probe 70 to enter the spa. Both the contours of the diverter cap 100 and the air and water from the jets exiting the bores 102 help refract the light. The eyeball and diverter cap can be made of many different materials, but are preferably made of an acrylic or polycarbonate.

Figure 9:
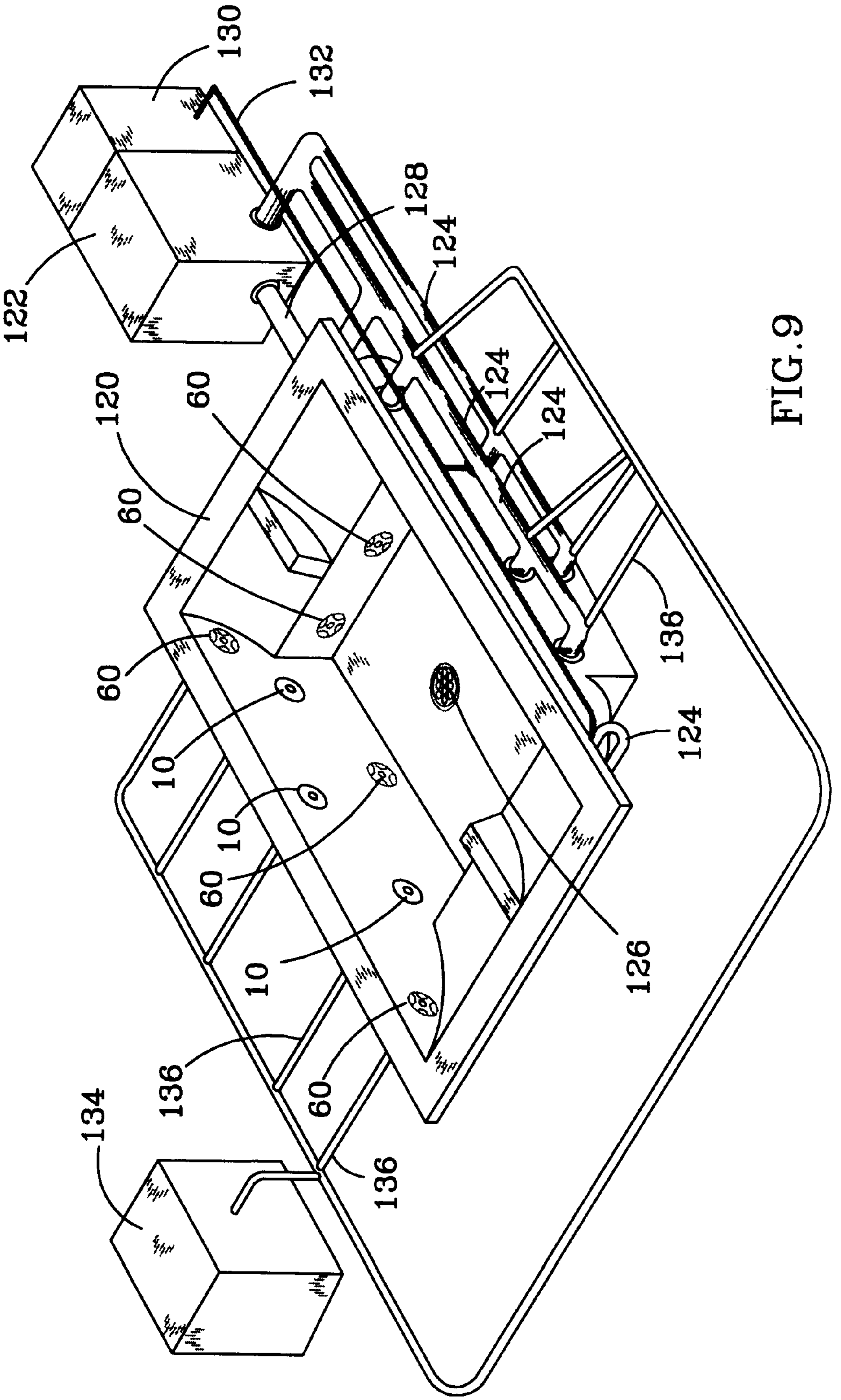
FIG. 9 is a perspective view of a spa system using the new fiber optic lighting.

As shown in FIG. 9, multiple jets and other components having fiber optic illumination can be installed in a spa shell 120 with stationary jets 10, pulsating jets 60 and/or other types of illuminated jets.

The jets are connected to a water pump system 122 which circulates the water throughout the spa system through a series of water conduits 124. Water from the spa 120 is provided to pump 122 through a drain 126 which is connected to a return water conduit 128, and in turn to pump 124. Water from pump 22 is delivered back to spa 120 through conduits 124, and flows through the into the interior of shell 120, completing the loop. Additionally, an air system 130 can be included that provides air to the jets 10 and 60, through an air conduit 132 to aerate the water flowing through the jets. Air system 130 can be pump driven to increase the pressure of the air entering the jet, or the system can be vacuum based with the venturi located within the jets drawing air into the jet water streams.

A remote fiber optic light source 134 provides light that is carried by optical fibers 136 to the jets, and to any other desired component such as the drain 126, if desired. The light source can have a single color, or it can include a color wheel that rotates to continuously change the color. The jets and the drain 126 each include a probe, with one or more of the optical fibers inserted into each of the probes. Light travels from the light source 134 into the jet and the drain 126. The light that emits from the ends of the optical fibers is refracted through the probes to illuminate the water in the spa 120.

Although the present invention has been described in considerable detail with reference to certain preferred configurations, other versions are possible. The invention can be used in spas, pools, tubs and the like. Different spa, pool or tub components can use the invention for water illumination. Therefore, the spirit and scope of the appended claims should not be limited to the preferred versions described above.

I claim:

1. A Fight for a water reservoir, comprising:

a reservoir component having a body adapted to extend through a wall of a reservoir with the majority of said body positioned behind said reservoir wall;

a light guide arranged to transmit light from a light source to said component; and a probe within said component body arranged to receive light from said guide and pass it through said body, the light from said guide passing through said probe and emitting from said component body into said reservoir.

2. The light of claim 1, wherein said guide comprises an optical fiber.

3. The light of claim 1, wherein said probe is elongated and hollow along most of its length, open at one end and closed at the other and mounted within said component with said guide housed within said probe.

4. The light of claim 3, wherein said probe further comprises threads on its exterior surface, and said component includes an opening which receives said probe, said opening including threads along its interior surface that mate with said probe threads to form a watertight seal.

5. The light of claim 3, wherein said probe is mounted within said component with a watertight mounting that prevents reservoir water from entering the interior of said probe.

6. The light of claim 1, wherein said probe extends from the rear of said component out the front of said component.

7. The light of claim 1, wherein said probe extends from the rear of said component partially through said component toward its front, said component is transparent between the end of said probe and the front of said component to transmit light from said probe through the front of said component.

8. The light of claim 1, wherein said probe is solid, and said guide transmits light through said probe to the front of said component.

9. The light of claim 1, wherein said probe comprises a transparent or semitransparent material.

10. The light of claim 1, wherein said component is one from the group consisting of a jet and a drain.

11. The light of claim 1, wherein said component comprises a jet having a longitudinal axis, said probe mounted along said jet's longitudinal axis and extending from its rear toward its front.

12. A jet with fiber optic illumination, comprising:

a jet body;

a water inlet to said body;

a water nozzle within said body for forming water flowing through said inlet into a stream;

an elongated probe mounted within said jet body along its longitudinal axis, said probe extending from the rear of said body toward its front and being at least partially transparent at its front end;

an optical fiber arranged to transmit light from a light source to said probe, the light from said optical fiber directed through said probe and emitting from said jet body.

13. The jet of claim 12, wherein said water nozzle forms a venturi and said jet body includes an air inlet for aeration of water flowing through said nozzle.

14. The jet of claim 13, wherein said probe passes through said venturi.

15. The jet of claim 12, wherein said probe includes threads on its exterior surface and said jet body further comprises an opening which receives said probe, said opening including threads along its interior surface that mate with said probe threads to form a watertight seal.

16. The jet of claim 12, wherein said probe protrudes past the front of said jet body.

17. The jet of claim 12, wherein said probe extends partially along said longitudinal axis and terminates short of the jet's front end, said jet being transparent between its front and the end of said probe to transmit light from said probe out its front.

18. The jet of claim 12, wherein said probe is elongated and hollow along most of its length, open at one end, and closed at the other, and said optical fiber is housed within said probe.

19. The jet of claim 12, wherein said probe is solid and said optical fiber directs light through said probe to its front end.

20. A system for illuminating a reservoir of water, comprising:

a reservoir shell capable of holding water;

at least, one reservoir component having a body adapted to extend through a wall of a reservoir shell with the majority of said body positioned behind the wall of said reservoir shell;

a water pump system that circulates water between said reservoir and each of said components;

a remote light source;

at least one light guide arranged to transmit light from said remote light source to one respective component; and each of said components including a probe within the component body that is arranged to receive the light from a respective guide and pass it through said body, the light from each guide passing through a respective probe and emitting from said component body into said reservoir shell.

21. The system of claim 19, wherein said guides comprise optical fibers.

22. The system of claim 19, wherein each probe is elongated and its respective component includes an opening for said probe to be mounted within the component with a watertight seal between the probe and component.

23. The system of claim 19, wherein said component is one from the group consisting of jet, drain, return, skimmer.

* * * * *